United States Patent
Fujii

[15] 3,646,861
[45] Mar. 7, 1972

[54] EXPOSURE PHOTOMETRY SYSTEM FOR PHOTOGRAPHIC CAMERA

[72] Inventor: Tatsuo Fujii, Tokyo, Japan
[73] Assignee: Nippon Kogaku K.K., Tokyo, Japan
[22] Filed: Dec. 23, 1969
[21] Appl. No.: 887,559

[30] Foreign Application Priority Data
    Dec. 27, 1968 Japan..................43/95777

[52] U.S. Cl. ..................95/10 C, 95/42, 95/64 C
[51] Int. Cl. ..................G03b 7/04
[58] Field of Search..........95/10 C, 42, 64 R, 64 A, 64 C

[56] References Cited
UNITED STATES PATENTS

| | | | |
|---|---|---|---|
| 3,427,946 | 2/1969 | Broschke et al. | 95/10 C X |
| 3,466,447 | 9/1969 | Fahlenberg | 95/10 C UX |
| 3,489,071 | 1/1970 | Mohr et al. | 95/10 C X |
| 3,082,672 | 3/1963 | Swarofsky et al. | 95/42 X |
| 3,485,153 | 12/1969 | Ono et al. | 95/10 C |
| 3,385,185 | 5/1968 | Schulze | 95/10 C |

*Primary Examiner*—Joseph F. Peters, Jr.
*Attorney*—Ward, McElhannon, Brooks & Fitzpatrick

[57] ABSTRACT

Exposure photometry system of photographic equipment provided with a light-receiving portion of exposure meter passing through at least a part of the photographic optical system. When obtaining an exposure for an aperture smaller than a specified aperture of the photographic optical system, the light is measured in like manner to full-open photometry by letting the light passing through said specified aperture be accepted by the light-receiving portion. On the other hand, when obtaining an exposure for an aperture larger than said specified aperture, the light passing through said larger aperture is accepted by the light-receiving portion of the exposure meter.

4 Claims, 15 Drawing Figures

EXPOSURE PHOTOMETRY SYSTEM FOR PHOTOGRAPHIC CAMERA

This invention relates to an exposure photometry system for a photographic device provided with a finder optical system and a light-receiving portion accepting the light rays passing through the iris of the phototaking optical system.

In conventional light-measuring systems there have been (1) Full-open light-measuring systems in which the preset aperture scales are unequally spaced near the full-open aperture, (2) Full-open light-measuring systems, in which the preset aperture scales are equally spaced, and the picture obtained is correctly exposed at the center but the peripheral sections thereof are allowed to be under exposed, and (3) stopped-down light-measuring systems.

In the light-measuring system of the type (1), due to the presence of unequally spaced portions in the preset aperture scales, the intermediate aperture stop is hard to observe at that portion and it is not easy to display the preset aperture value on the camera side, for example, inside the finder. Moreover, since the aperture must be changed functionally at that portion, the mechanism becomes complicated by the incorporation of a cam, etc. Namely, the finder aperture scales in the finder corresponding to the unequally spaced portion must be prepared separately for each lens or each full-open F number, or a complicated differential mechanism which produces the same effect as above must be added.

In the light-measuring system of the type (2), the picture taken near the full aperture is as a whole underexposed. When there are two or more than two different kinds of lenses having the same full-open F number, it is usual, for simplicity, to use the common index or use mechanism equivalent to it for the same full-open F number. However, since the optical characteristics, e.g., the amount of peripheral light and the incident light angle at full-open aperture, have comparatively large fluctuations, the error caused by the fluctuations cannot be reduced. For the lenses in which the exposure time is linked with the aperture so that the effective F number can be maintained at small aperture diameters by advancing or zooming the lens but is not linked with full-open aperture, the measured light value must be corrected specifically corresponding to the advanced amount at the full-open photometry.

In the light measuring system of the type (3), since the dark side limit of the light capable of being measured at an aperture which is most often used in daily photography is elevated, it becomes difficult to obtain a suitable combination of brightness and an aperture that has many chances in practical use. Moreover, when the finder is located behind the diaphragm, it becomes dark when the aperture is small and, further, since the effect of the incident light from the ocular is relatively increased, the measuring error is also increased.

An object of this invention is to provide an exposure-metering system in the photographing equipment provided with a finder optical system and light-accepting part for the exposure meter which receives the light passing through the diaphragm of the photographing optical system, in which: (1) the preset aperture scales are equally spaced and the aperture value can be easily displayed in the finder; (2) adequate exposure (the peripheral portion is not under exposed) can be given to the entire image surface when the exposure is made at and near the full-open aperture according to the indication of the exposure meter; (3) in case of the finder receiving the light passing through the iris of the phototaking optical system, there is no fear that the phototaking aperture may tend to deviate to a larger size of shallow depth due to the darkness of the finder at a small aperture as in the case of a stopping-down light-measuring system; (4) exposure error at full-open aperture due to the difference in optical characteristics such as the distributional difference of peripheral light amount is small even when there are many lenses to be used having the same full-open F number; (5) the dark side limit of the brightness that can be measured does not differ much for different aperture values as is the case in stopping-down exposure-metering systems.

This invention offers an exposure-metering system of photographing equipment provided with a light-receiving part of the exposure meter which accepts the transmitted light from at least a part of the photographic optical system, in which when obtaining an exposure for an aperture smaller than a specified aperture of the photographic optical system, the light is measured like full-open light measurement by letting the transmitted light at said specified aperture be accepted by the light-receiving part of the exposure meter; and when obtaining an exposure for an aperture larger than said specified aperture, the light is measured in a manner like the stopping-down light measurement by letting the transmitted light at said aperture diameter be accepted by the light-receiving part of the exposure meter.

The present invention will be described in more detail when referring to illustrative embodiments of this invention as shown in the attached drawing, in which.

Figure 1:
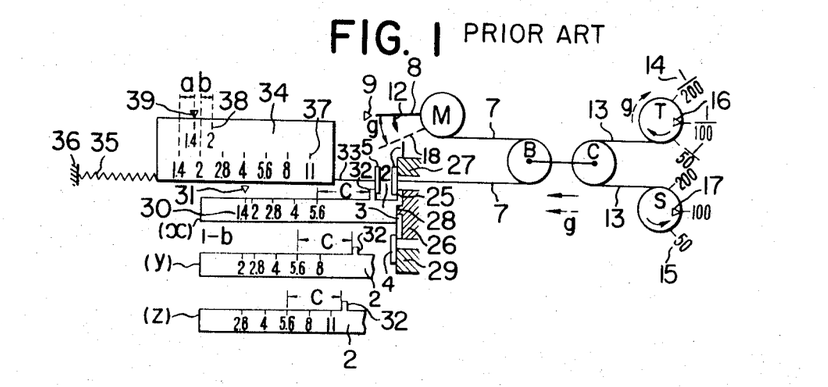
FIG. 1 is a diagram showing a conventional full-open photometry system in which the preset aperture scales are unequally spaced in the vicinity of full-open aperture.
Figure 2:
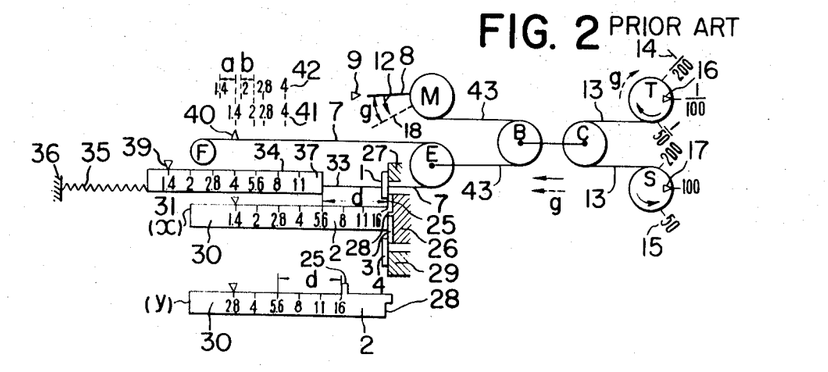
FIG. 2 is a diagram showing another conventional full-open photometry system in which the preset aperture scales are equally spaced.

Now referring to FIGS. 1 and 2, the conventional full-open photometry system will be explained. FIG. 1 shows a conventional full-open light-measuring system having preset aperture scales unequally spaced near the full-open aperture, and FIG. 2 shows another conventional full-open light-measuring system which has the preset aperture scales equally spaced and which allows the peripheral sections of the picture to be rather underexposed although the center portion is correctly exposed.

In FIG. 1, an exposure meter interlocking member 1 is interlocked with a galvanometer M of the exposure meter by means of a belt 7. B and C are two pulleys which are movable to the right and left, but are not able to make any movement between them. One end of the belt 7 winds, via the pulley B, around the galvanometer M, which is rotatable around a fixed shaft, and the other end is connected to said exposure meter interlocking member 1. Said galvanometer indicates the exposure amount in ev. unit values which are arranged with equal spacings. Against a pointer 8 of the galvanometer, a fixed index mark 9 is provided. The galvanometer M is connected in a circuit shown in FIG. 5, which will be explained later, and the pointer thereof moves corresponding to the amount of light that has passed through the lens from the zero point which is the position corresponding to zero current. When the amount of light is reduced, said pointer of the galvanometer rotates in the direction of arrow 12. A belt 13 passes around the pulley C and has one end wound around and attached to the shutter speed dial T, which is rotatable around a fixed shaft. The other end of the belt is wound around and attached to the film speed dials, which is rotatable around a fixed shaft. The index marks 16 and 17 which indicate the shutter speed scale 14 and the film speed scale 15 are on the shutter speed dial T and the film speed dial S, respectively. When the galvanometer pointer 8 has rotated by, for example, $g$ steps as shown by the dotted line 18 due to the reduction in the amount of accepted light, the pointer 8 can be matched to the fixed index mark 9 by rotating the shutter speed dial in the direction of arrow by $g$ steps. When the film speed dial S is rotated in the direction of arrow by $g$ steps, the pointer 8 shifts in the opposite direction of the arrow 12 by $g$ steps. (By rotating the shutter speed dial T or the film speed dial S in the direction of arrow by $g$ steps, the pointer 8 can be set to the fixed index mark 9).

The exposure meter interlocking member 1 is always in contact with a projection 25 of the lens preset aperture member 2 and, when said projection 25 hits the lens body 26, the member 1 hits the camera body 27. The end portion 28 of the preset aperture member 2 is in contact with the diaphragm member 3 which is interlocked with the lens diaphragm blade which is not indicated in the drawing. Said diaphragm part makes contact with the automatic diaphragm drive member 4 on the camera. A portion 29 of the camera determines the position of said automatic diaphragm drive member 4 on the camera in other times than the picture taking time. The preset aperture member 2 has the stop scales 30 which are facing the index mark 31 on the lens. Moreover, said preset aperture member 2 has a projection 32 which is in contact with a finder scale positioning member 5. Said positioning member 5 is connected to the scale plate 34 by means of a belt 33 and is always pulled toward the camera body 36 by means of a spring 35. On said scale plate 34 are provided equally spaced aperture scales 37 and unequally spaced aperture scales 38 visible in the finder. The index mark 39 fixed on the camera body is also visible in the finder. Among the preset aperture members shown by the symbol 2 in the drawing, $x$ is the preset aperture parts for full-open F number $f/1.4$, $y$ is for full-open F number $f/2$, and $z$ is for full-open F number $f/2.8$.

Figure 5:
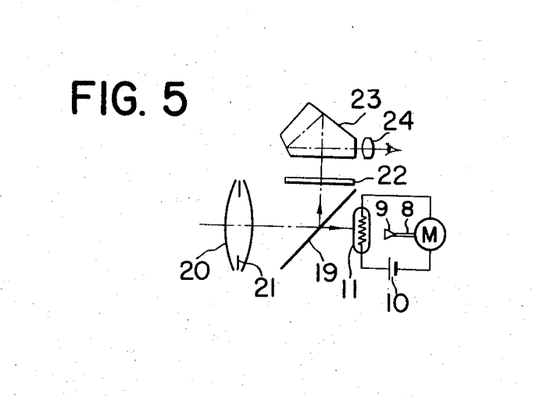
FIG. 5 shows a diagram especially of an optical system for receiving light together with an exposure meter circuitry.

FIG. 5 shows the layout of the optical system, the light-accepting part, and the exposure meter circuit of a TTL light-measuring system. In the drawing; 10 is a battery, 11 is a CdS cell, M is a galvanometer, 19 is a half-mirror, 20 is a phototaking lens, 21 is a focusing glass, 23 is a pentaprism, and 24 is an eyepiece.

Through FIG. 1 to FIG. 13, the same symbols show the same kinds of parts. The dimensions $a$ and $b$ of FIGS. 1 and 2 are equal to the dimensions of $a$ and $b$ of FIG. 7 on the step basis. The dimensions $c$, $d$, $e$, and $f$ in FIG. 1 through FIG. 4C are of constant values, respectively. In FIG. 1 through FIG. 4C, the exposure meter interlocking member 1, the preset aperture member 2, the diaphragm member 3 interlocked with the diaphragm blades of the lens, the automatic diaphragm member 4 on the camera side, the scale positioning member 5, and other parts connected to them are all assumed to be able to move only to the right and left. In almost all the common examples, the motion is assumed to be rotary motion. However, in the examples the motions concerned are assumed to be the parallel movements in right and left directions to simplify the explanation.

In FIG. 2, only the equally spaced finder displayed scales 37 are shown. The belt 7 that connects to the exposure meter interlocking member 1 first lays over the pulley E, which is movable in right and left directions, and then winds around the dial F of the fixed shaft. There is an index mark 40 on the belt 7 which indicates correction scale for each full-open F number (or for each lens). The equally spaced scales 42 are additionally described for reference which function to show clearly the state of unequal spacings of said corrections scales 41. The belt 43 which starts from the supporting shaft of the pulley E functions like the belt 7 shown in FIG. 1. Explanation of other reference numerals are omitted because they represent the same parts as those in FIG. 1.

Figure 7:
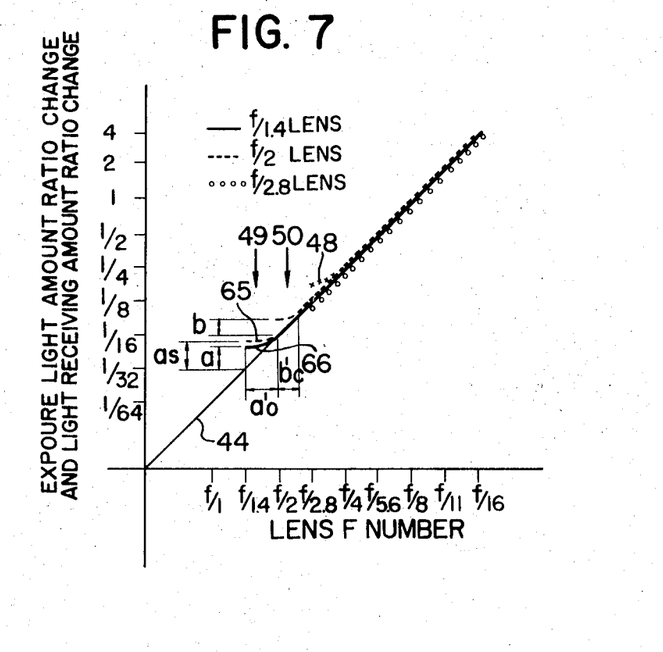
FIG. 7 is a graph showing the relationship between the stop value of the lens and the appropriate exposure light amount.

FIG. 7 is a graph showing the change in proper exposure amount ratio and the change in the ratio of the amount of accepted light by making $f/8$ as 1 and assuming that the center transmittivity is the same. In FIG. 7, the lens F numbers are taken on the horizontal axis and proper exposure amount ratios and accepted light amount ratios on the vertical axis. Said graph shows the change in the proper exposure amount as the F number of the lens is stopped down. The center transmittivity is not involved because the system is a TTL system and therefore it is shown as the same value. In the following explanation the proper exposure amount ratio is assumed to be identical with the accepted light amount ratio. In the drawing are shown the ideal proper exposure amount ratio change 44, the exposure amount ratio change 66 of a lens with the full-open aperture of $f/1.4$, the exposure amount ratio change of a lens with the full-open aperture of $f/2$, and the exposure amount ratio change of a lens with the full-open aperture of $f/2.8$. With the lens having a full-open aperture of $f/1.4$, the change is seen displaced from the ideal change between the steps from full-open and the $a'_o$ step. The amount is $a$ step at full-open. In the $a'_o$ step the graph makes a curve. With the lens having the full open aperture of $f/2$, the graph shifts from the ideal line within the range full-open to the $b'_c$ step, the shift amount at full-open aperture being $b$ step. The graph for the lens which is full-open at $f/2.8$ is almost identical with the ideal line. Contrary to these lens group, in the full-open light-measuring system having the preset aperture scales unequally spaced near the full-open aperture as shown in FIG. 1, proper exposure at each preset aperture scale of $f/1.4$ lens cannot be attained until the scales between $f/1.4$ and $f/2$ are reduced to $(1-a)$ steps as shown in $x$ of FIG. 1 and the aperture scale is made to change functionally within this range. Therefore, the finder displayed scales need separate scales 38 for the range 1.4 to 2 that corresponds to said unequally spaced portion or a mechanism (for example, a differential mechanism) which equals in function. In the full-open light-measuring system shown in FIG. 2 where the preset aperture scales are equally spaced, the center section of the image surface matches the ideal line 44 near the full-open aperture. Therefore, taking only the center portion as properly exposed, the difference between the full-open measured amount of light and the amount of light of only the center portion is corrected for each full-open F number or for each lens. In the case of full frame light measurement, the correction amount is almost identical with $a$ and $b$. The correction is performed by matching the index mark 40 with the scale 41 or by providing a mechanism that functions in the same manner. In this case, when there are different kinds of lenses with the same full-open F number, since it is a complicated matter to provide an index mark for each lens, a scale such as for center value is used, so that the error is caused by the nonuniformity of the lenses. The position of the scale 41 is displaced from the equidistant scales 42 by $a$ for full-open aperture $f/1.4$ and by $b$ for full-open aperture $f/2$.

Next, operation of the conventional structural example will be explained referring to FIGS. 1 and 2. When the preset aperture member 2 or the shutter speed dial T is rotated so that the pointer 8 matches the fixed point 9, the position of the preset aperture member 2 is set at there. The shutter priority EE (electric eye) system is the system in which the positioning of said preset aperture part 2 is determined by displacement of the step cam interlocked with the shutter button stroke that corresponds to the displacement of the pointer. Therefore, the end section 28 of the preset aperture member 2 is set at the position indicated or the position to the left of it. The aperture at this time can also be read from the index mark 39 within the finder. When the shutter is released, the automatic diaphragm drive member 4 on the camera side runs leftward sufficiently by the action of the quick return mechanism just prior to the operation of the shutter, the diaphragm members 3 linking with the lens diaphragm blades follows said drive member 4, stops on hitting said end section 28 and, when the diaphragm is being stopped down, the shutter opens to complete the exposure. On the way the drive part 4 returns after exposure, it catches the interlocked diaphragm member 3 and pushes it back rightward, and the diaphragm is opened. The above-mentioned explanation applies both to FIG. 1 and to FIG. 2, and it is the shutter priority EE system in which the positioning of preset aperture member 2 or the matter equivalent to it is determined automatically corresponding to the rotating angle of the galvanometer.

Figure 3:
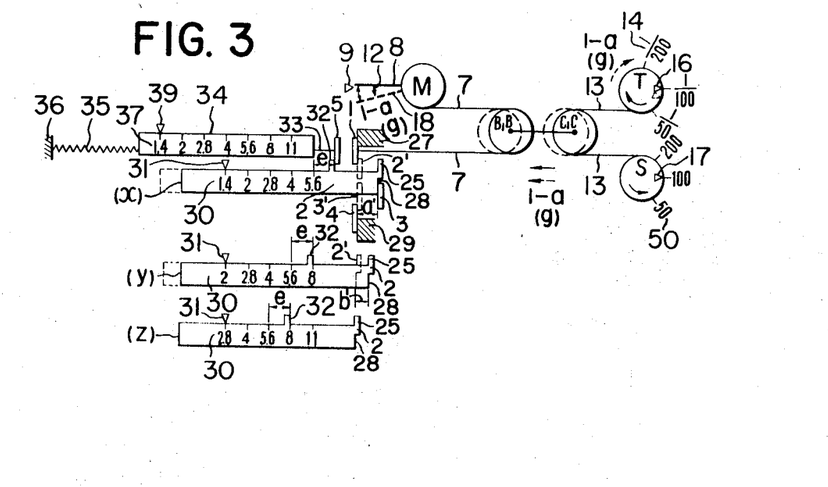
FIG. 3 shows a diagram of a first embodiment of this invention.

The first embodiment shown in FIG. 3 is a conventional full-open light-measuring system having said preset aperture scales unequally spaced near the full-open scale as shown in FIG. 1 to which this invention is applied.

In FIG. 3, the diaphragm member 3, interlocking with the lens diaphragm blades, moves to the right of the automatic diaphragm drive member 4 on the camera by $a'$ step which is almost equal to $a'_o$ step in FIG. 7, by being pushed by the end section 28 of the preset aperture member 2. Simultaneously, the projection 25 on the preset aperture member 2 is so constructed as to shift from the exposure meter interlocking member 1 by the same amount. Therefore, above the specified aperture value ($f/2$ in this case) that corresponds to the position 2' indicated by dotted line where the projection 25 of the preset aperture member 2 contacting with the member 1 and to the position 3' indicated by dotted line where the automatic diaphragm drive member 4 on the camera contacting with the member 3, the measured aperture and the phototaking aperture coincides and stopped-down light measurement is performed, and at an aperture value smaller than said specified aperture value, the measured aperture is retained at said specified aperture value and the full-open light measurement is performed. Therefore, the finder is not darkened any more, the effect of incident light from the eyepiece is small, and thus a correct light measurement can be performed. When an aperture is larger than said specified aperture, correct movement of the pointer of the galvanometer and correct indication can be attained even when the preset aperture scales are equally spaced, and the unbalance that only the center portion is correctly exposed and the periphery portion is underexposed is dissolved, and thus a well-balanced exposure indication can be obtained. For example, when the aperture is changed from the full-open aperture $f/1.4$ down to specified aperture $f/2$, the pointer 8 moves by $(1-a)$ step as indicated by 18, and the pointer 8 can be made to match the fixed point 9 again by setting the shutter speed dial T to $(1-a)$ step slower.

Figure 4A:
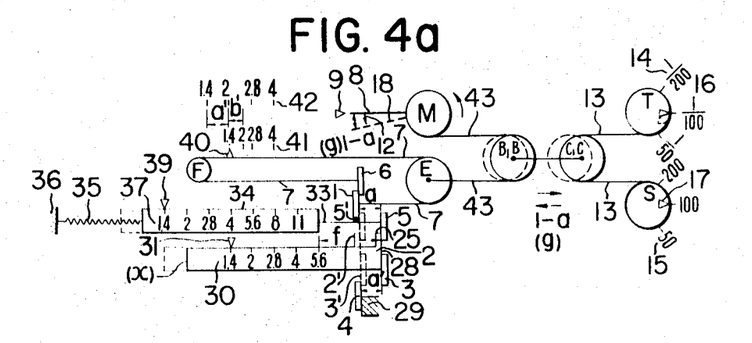
FIGS. 4a, 4b and 4c show diagrams of a second embodiment of this invention using lenses of full-open F numbers of 5/1.4, 5/2 and 5/2.8, respectively.
Figure 4B:
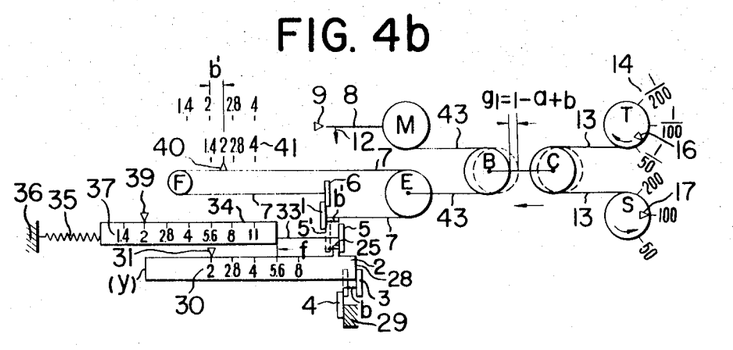
Figure 4C:
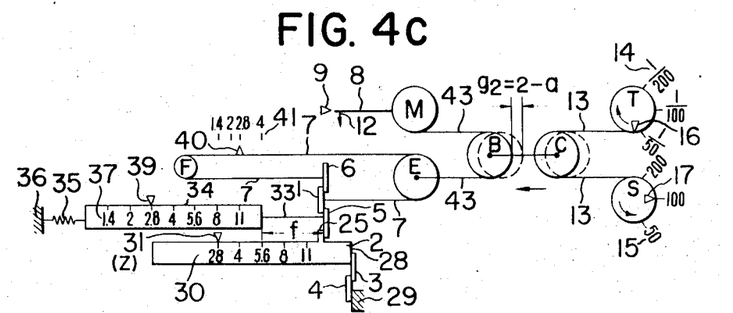

Next, the second embodiment will be described referring to FIGS. 4a, 4b, and 4c. The second embodiment is a conventional full-open light-measuring system having said equally spaced preset aperture scales of FIG. 2, to which this invention is applied. FIGS. 4a, 4b and 4c are the line drawings showing its construction where the cases in which the lenses having the full-open F numbers of $f/1.4$, $f/2$ and $f/2.8$, respectively, are shown. In FIG. 4a, the scales 41 are displaced from the equally spaced positions 42 by $a'$ steps. When a lens with the full-open aperture of $f/2$ is used, since $b'$ step, which is almost equal to the $b'_o$ step in FIG. 7, exists between the full-open aperture and the specified aperture as shown in FIG. 3, ($y$) for the first embodiment and in FIG. 4b for the second embodiment, the relative positions of the exposure meter interlocking member 1 of the preset aperture part 2 and the diaphragm member 3 which is interlocked with the lens diaphragm blades are the same as described above. In the second embodiment, as shown in FIG. 4b, the correction scales 41 are provided being displaced by $b'$ step from the equally spaced reference scales 42, and the dial F is set so that the index mark 40 matches. Of course this correction can be replaced by equivalent methods such as to change the position of the fixed pin provided on the lens mount for each lens and by this the correction is interlocked with the mounting of the lens. The correction scales 41 becomes equally spaced when a specified aperture scale is added. The steps $a'$ and $b'$ may be sufficiently larger than $a'_c$ and $b'_c$, respectively. FIG. 3 and FIG. 4c show the first embodiment and the second embodiment, respectively, in which the lens having the full-open aperture of $f/2.8$ has characteristics which are close to the ideal line all over the ranges in FIG. 7.

The positions of the pulleys B and C and the position of the index mark 16 of the shutter speed dial T in FIGS. 4b and 4c are, when compared at full-open aperture positions, displaced from the positions in FIG. 4a by $g_1=1-a+b$ and $g_2=2-a$, respectively. In the case where the lenses having the same full-open F number and different peripheral light amount distributions, for example, in the lenses having the same full-open aperture of $f/1.4$, but having different values of $a'_{oxa}$, even if it is constructed to have a common specified aperture, the exposure amount indication error caused by the nonuniformity in the optical characteristics for each lens at full-open time is eliminated by taking $a'$ equal to or larger than the maximum value of $a'$ and, when taking the value of $a'$ smaller than the maximum value of $a'_o$, said nonuniformity being considerably reduced compared with that of a conventional full-open measuring time (the case of FIG. 2), and thus the error is reduced. This is explained by the fact that, in FIG. 7, when the lenses of the same full-open F number were compared, the width of fluctuation is indicated at 49. With lenses having the same full-open F value, said error can naturally be eliminated by making the $a'$ to take separate values in FIG. 3 or, in FIG. 4a, by preparing the correction scale 41, separately for each lens or by adding a mechanism equivalent to it. Moreover in a lens where the aperture diameter varies responsive to the advancement of the lens, for keeping the effective F number unchanged at small apertures but cannot vary at full-open aperture, if said specified aperture is determined as the largest aperture (or the aperture smaller than it) among the diameters of apertures, which are interlocked with the advancement of the lens over the full range of advancement, the troublesome correction required, after measurement in the full-open light measurement, according to the amount of advancement and to the aperture value, becomes completely unnecessary. As can be understood from the constructions and the functions mentioned above, the expected effect of this invention can be obtained.

Figure 6:
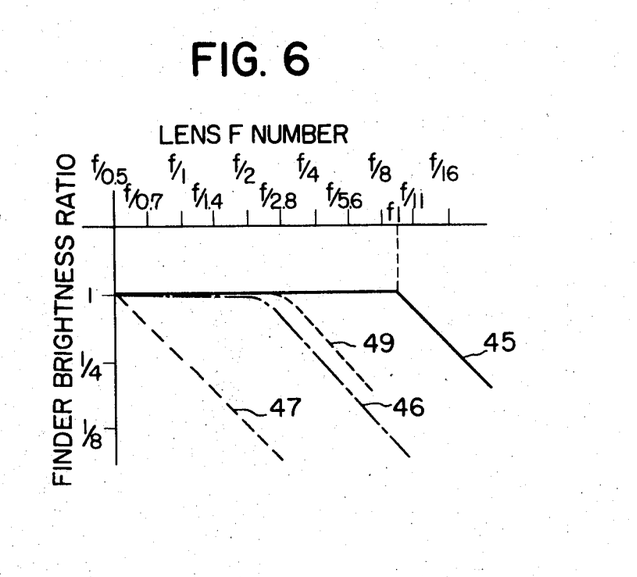
FIG. 6 is a graph showing the relationship between the stop value of the lens and the brightness of the finder.

There still remains one fear to be considered. It is the disadvantage that might be caused by the finder which becomes dark when the specified aperture is smaller than the full-open aperture. The brightness of the finder at viewing time is determined depending on the diameter of the pupil, the aperture of the lens at that time, the degree of diffusion made by the focusing glass, and the brightness of an object to be photographed. Assuming that the brightness of an object and the diameter of the pupil are under the same conditions, the relationships between the brightness and the lens aperture for each dispersion degree of the focusing glass are shown in FIG. 6. In FIG. 6, 45 is the case in which the focusing glass is a transparent that has no diffusion characteristic. In this case the brightness does not change from the full-open aperture to a certain aperture $f_1$, and after this the brightness is reduced in proportion to the aperture. Said aperture $f_1$ is almost equal to the distance between the focusing glass and the eyepiece divided by the diameter of the pupil. The former is 70 mm. in a certain camera and the diameter of the pupil, which differs with the brightness, is about 7 mm. at most. FIG. 6 shows such a case where $f_1=10$. In the usual case, $f_1$ becomes larger than $f_1=10$ and the diameter of the pupil is smaller than the above. The dotted line 47 shows the case in which the focusing glass is assumed to diffuse the light completely. In this case the finder becomes darker as the aperture is stopped down more and more. From reasons of manufacturing techniques, it is impossible to obtain a normal focusing glass having diffusions winder than a certain degree such as the one shown by 47, and what is obtainable becomes, for example, the one shown by 46, which is the curve for the case in which the diameter of the pupil is 6 mm. and the distance between the focusing glass and the ocular lens is the same as mentioned above. The diffusion characteristic of the focusing glass is reduced to a half at half angle 4°, and is reduced further to a half at 6°30'. Therefore the focusing glass whose characteristic lies between the lines 46 and 45 of FIG. 6 can at least be made freely. The focusing glasses found on many cameras at preset have the diffusion characteristic almost equal to the line 46. Accordingly, the disadvantage of the darker finder is not thought of so much in the case of this invention. When the finder becomes dark it can be compensated for by narrowing the degree of diffusion of the focusing glass. For example, suppose that the focusing glass is interchangeable and the lens has the full-open F number of $f/2.8$ and the change in accepted light amount ratio is like 48 of FIG. 7, it is possible to compensate for the brightness of the finder to such a degree that the brightness is not low compared with the brightness obtained when said lens is fully opened by making the diffusion degree of the focusing glass somewhat sharper and using the one having the characteristic shown by the curve 49′ of FIG. 6 to make the focusing glass suitable to said lens. It is also possible to make the diaphragm full open at the time of observation through the finder by adding a mechanism which is enabled to shift the aperture member 3, which is interlocked with the lens diaphragm blades, to the right boundary at any time, using an separate external force in FIG. 3 and FIG. 4a. In this case, if the exposure meter circuit is so made as to be opened corresponding to its operation, then the fear of making an erroneous light measurement is liquidated.

Moreover, a combination with the EE mechanism is also possible. For example, in FIGS. 3 and 4a through 4c, if the shutter speed dial T is fixed and the deflection angle of the galvanometer M is converted for example into the length of stroke by a well-known EE mechanism, by using a stepped cam, and the shutter speed is selected by said stroke, an embodiment of this invention in aperture priority EE cameras is obtained. Of course a programmed EE system can be obtained in this case if said stroke is made to link with the preset aperture member 2.

Figure 8:
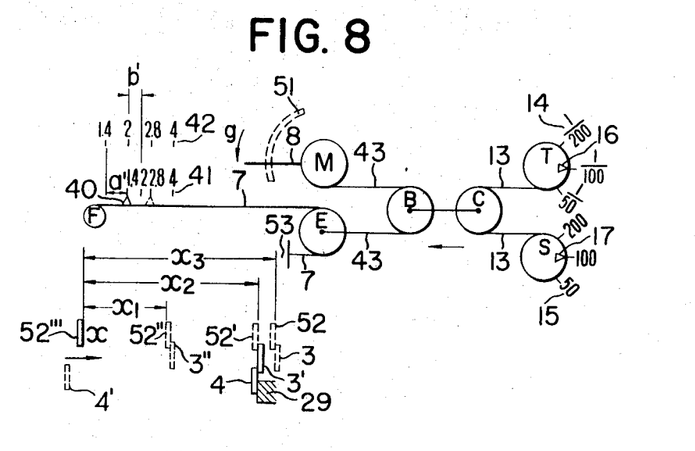
FIG. 8 shows a diagram of a third embodiment of this invention.
Figure 9:
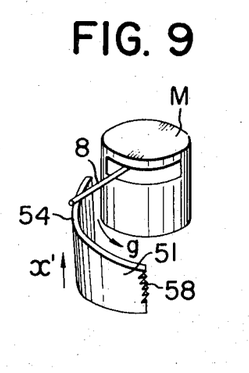
FIG. 9 shows an enlarged perspective view of galvanometer and cam portion of the third embodiment.
Figure 10:
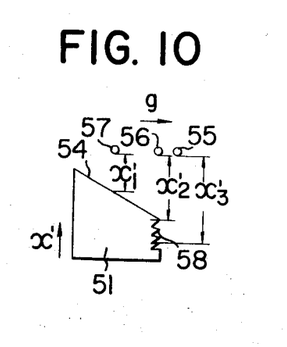
FIG. 10 shows a developed diagram of the cam portion in the third embodiment.

Next, the third embodiment will be explained referring to FIGS. 8 through 11. The third embodiment is the combination of the invented light-measuring system with a shutter priority EE mechanism which employs a galvanometer. In FIG. 8, the end of the belt 7 working over the dial F is fixed on the camera body 53 after running around the pulley E. Member 52 corresponds to the preset aperture member 2 of FIG. 4a which is normally retracted to the position 52′′′. At this time, the diaphragm member 3 which is linking with the lens diaphragm blades is stopped at the position 3′ of the specified aperture value. Below the galvanometer pointer 8 there is a cam 51 which moves up and down (FIG. 9). In FIG. 9, the cam 51 has an inclined surface 54 and a tooth train 58 which moves vertically in the direction of $x'$. FIG. 10 is the development of the cam 51. The member 52 and the cam 51 are interlocked with each other and are linked with the push-in stroke of the shutter button before the release of the shutter mechanism. When the shutter button is depressed, the member 52 which is at the position 52′′′ moves in the $x$ direction in FIG. 8 and the cam 51 moves in the $x'$ direction in FIGS. 9 and 10. When the incline surface 54 of the cam 51 makes contact with the pointer 8 or when the pointer 8 enters the tooth train 58 from sideways, the cam 51 stops at that position and the member 52 also stops regardless of the shutter button which is still depressed. The mechanism concerned with this is a well-known EE mechanism although it is not indicated in the drawing.

Figure 11:
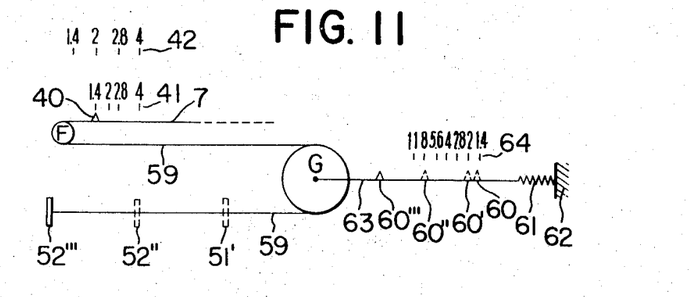
FIG. 11 shows a correction scale of the third embodiment and the scales within the finder.

Furthermore, as shown in FIG. 11, the dial F has another belt 59 which is connected to the member 52 by way of the movable pulley G. On the pulley G, the belt 63 is fastened around the shaft and is fixed on the camera body 62 by the spring 61. On the belt 63 is fixed the index mark 60 against the aperture scales 64. Said aperture scales 64 and the index mark 60 that points to said scales can be read off in the finder.

Next, the operation will be explained. A lens having the full-open F number $f/1.4$ will be taken as the example. First, the index mark 40 is set to 1.4 of the scales 41 in the same manner as the second embodiment shown in FIG. 4a. Next, suppose that the pointer 8 is at position 57 of FIG. 10. When the shutter button is depressed, the cam 51 rises in the $x'$ direction, touches the pointer at a position apart from the original position by $x'_1$ and then stops its own movement. The member 52 positioned at 52′′′ in FIG. 8 moves to the position 52′′ by a distance $x_1$. Simultaneously, the index mark 60 of FIG. 11 moves from the position 60′′′ to the position 60′′ to show the aperture value at that time. The automatic diaphragm drive member 4 on the camera shown in FIG. 8 is at position 4 and the diaphragm member 3 linking with the lens diaphragm blades is at position 3′ now. When the shutter button is depressed farther, the automatic diaphragm member 4 moves to position 4′, the linked diaphragm member 3 moves to position 3′′ where it touches the part 52 positioned at said 52′′, the diaphragm is stopped down to the value indicated by 60′′, the shutter is opened in succession, and thus the exposure is performed. When the exposure is finished, the automatic diaphragm member 4 at position 4′ returns to position 4, and returns the interlocked diaphragm member 3, which is at position 3′′, to position 3′. At this time the member 52 still remains at position 52′′. Therefore the picture taking aperture can be read off from the index mark 60 at position 60′′ and the aperture scales 64. When the shutter button is freed, the member 52 also returns from position 52′′ to position 53′′′, and the cam 51 returns to the original position to set free the pointer 8. If the shutter button is depressed when the pointer 8 is at position 56 of FIG. 10, the member 52 moves from position 52′′′ to position 52′ by $x_2$ simultaneously, the interlocked diaphragm member 3 moves to position 3′, the index mark 60 moves from position 60′′′ to position 60′, and the cam 51 moves a distance of $x'_2$, and the exposure is made under the condition that each member is being set. When the pointer 8 is at position 55 in FIG. 10, the cam 51 moves the distance of $x'_2$ and the cam 51 continues rising after the part 52 at position 52′ makes contact with the interlocked diaphragm member 3 at position 3′. At this time the interlocked diaphragm member 3 is pushed by the member 52 and moved to position 52 of FIG. 8. During this period, the pointer 8 moves in the reverse direction to $g$ because the diaphragm is being opened and, contacts with the tooth train 58 of the cam 50 when the member 52 has just reached the position indicated in the drawing, and stops the cam at a position reached after making a travel of distance $x'_3$. Next, since the exposure is made under these conditions, at an aperture corresponding to the position of the interlocked diaphragm member 3 between the positions 3 and 3′, the aperture diameter at the time of light measurement and the aperture diameter at the time of exposure coincide with each other. At apertures smaller than this, the aperture is kept to an aperture which corresponds to the position 3′ of the interlocked diaphragm member 3.

Figure 12:
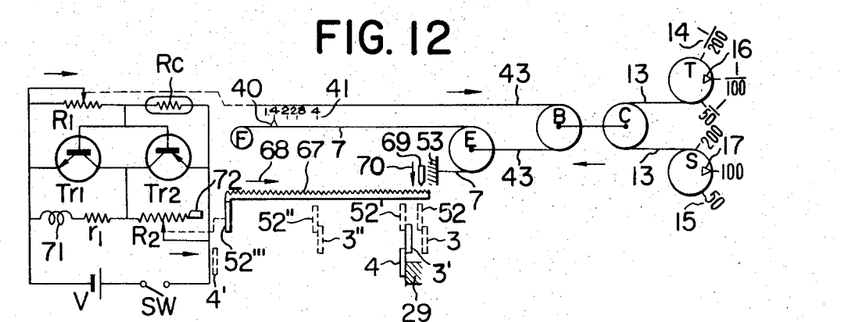
FIG. 12 shows a diagram of a fourth embodiment of this invention.

Next, the fourth embodiment of this invention will be explained referring to FIG. 12. The fourth embodiment is a combination of this invented light-measuring system with a shutter priority EE mechanism that employs no galvanometer. In FIG. 12, the exposure metering equipment has a balance detecting circuit in which the variable resistors $R_1$ and $R_2$ compose the reference value of said circuit, $R_c$ being a CdS cell, V the source battery, and 71 being a magnet coil which attracts the plunger 69 in the direction of arrow 70 when the transistor $T_{r_1}$ is not conductive; $r_1$ being a fixed resistor. Said variable resistors $R_2$ and $R_1$ are linked with the preset aperture member 52′′′ in the camera and the belt 43, which rotates the galvanometer M in FIG. 4a of the second embodiment, respectively. The variable resistor $R_1$ reduces its resistance as the belt 43 travels rightward and the variable resistor $R_2$ increases resistance when the preset aperture member 52′′′ moves rightward. One portion 72 of the variable resistor $R_2$ is the portion at which the resistance is kept constant regardless of the movement of the brush, and the preset aperture member 52′′′ corresponds to the left end of the resistor portion 72 when said preset aperture member 52′′′ is at position 52′. To the preset aperture part 52′′′ is connected the tooth train 67 which constitutes the controlling member and engages the plunger 69 and is fixed there when the plunger 69 is driven in the direction of arrow 70. Switch SW is turned on and interlocked with the initial stroke of the shutter button and is turned off after the plunger 69 has engaged and stopped the tooth train 67. Transistors $T_{r1}$ and $T_{r2}$ are so selected that both are nonconductive under balanced conditions. Under unbalanced conditions, $T_{r1}$ is conductive and $T_{r2}$ is nonconducting when the preset aperture member 52''' is at its position which corresponds to an excessively stopped-down aperture value, and $T_{r1}$ is nonconducting and $T_{r2}$ is conductive immediately after the balancing point is passed in the reverse direction. The preset aperture interlocked number 52''' moves rightward from the initial position (indicated as 52''') in linking with the second half-stroke of the shutter button. Although not illustrated, the plunger 69 is connected to a locking member once it engages with the tooth train 67 so that it does not return even when the magnet 71 loses the magnetic force. The locking is released when the shutter button is freed.

With such a construction, when the shutter speed dial T and the film sensitivity dial S are set to a certain shutter speed and a certain film sensitivity, respectively, and then the shutter button is depressed, the switch SW is closed first of all and then the preset aperture member 52''' is moved rightward until it reaches a point where the variable resistance $R_2$ balances with the CdS resistance, the variable resistance $R_1$, and the fixed resistance $r_1$. At the instant the balanced point is passed, the transistor $T_{r1}$ is turned off and a current sufficient for the magnet to operate is supplied. Then the plunger 69 engages and stops the tooth train 67 in such a way as, for example, to move the position of the preset aperture member 52''' to the position 52''. Next, the automatic diaphragm mechanism is released, the automatic diaphragm drive member 4 on the camera is retreated to the position 4', the interlocked diaphragm member 3 is moved from the position 3' to the position 3'', fixed and made to a predetermined aperture, and then the shutter is released. Next, the automatic diaphragm drive member 4 is returned from he position 4' to the position 4, the diaphragm is opened and, when the shutter button is freed, the circuit switch SW is opened and the plunger 69 is returned because said locking is released, and the tooth train 67 is returned to the original state. The CdS cell receives reduced illumination during exposure, the resistance $R_c$ is increased, the transistor $T_{r1}$ is turned on, and then the magnet 71 loses the force. However the engagement is continued due to the presence of said locking member which is not illustrated, until the shutter button goes back. When, at time of the shutter depression, the transistor $T_{r1}$ still remains conductive even when the preset aperture member 52''' has moved to the position 52'. Then the linked diaphragm part 3 is pushed from the position 52' to the position 3' to open the diaphragm. Accordingly the value of variable resistor $R_2$ is constant and the balanced state is obtained by the reduction in resistance $R_c$ of the CdS cell. This is, for example, the case in which the preset diaphragm member 52''' and the linked diaphragm member 3' are at positions 52 and 3 of FIG. 12, respectively. At apertures corresponding to the positions between the position 3 of the interlocked diaphragm member 3 and the position 3' of FIG. 12, the aperture diameter at time of measuring the light and the aperture diameter at time of exposure are identical. At apertures smaller than them, the aperture at time of measuring the light is maintained at a specified aperture which corresponds to the position 3' of the interlocked diaphragm member 3.

Figure 13:
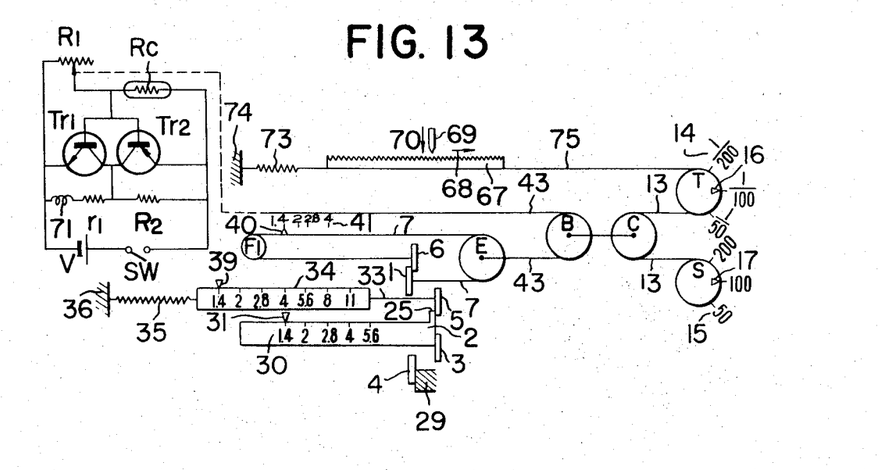
FIG. 13 shows a diagram of a fifth embodiment of this invention.

Next, the fifth embodiment will be explained referring to FIG. 13. The fifth embodiment is a combination of the light-measuring system according to this invention and an aperture priority EE mechanism without a galvanometer. In FIG. 13, although the exposure-metering equipment has a circuit similar to that shown in FIG. 12 of the fourth embodiment, the balancing circuit has a fixed resistor $R_2'$. The belt 43, which was linked with the galvanometer M of the exposure meter in FIG. 4a of the second embodiment, is linked in the fifth embodiment with the variable resistor $R_1$ as shown in FIG. 13. A belt 75 originating from the shutter speed dial T is connected to the camera body 74 at the other end by way of a tension spring 73. The tooth train 67 is connected on said belt 75. A plunger 69, which is to engage and stop the said tooth train 67, is provided facing said tooth train 67. Said plunger 69 is attracted by the magnet coil 71 in the direction of the arrow in the same manner as described in the aforementioned fourth embodiment. Other reference numerals are the same as those used in FIG. 4a of the second embodiment.

Once the aperture is determined, the exposure meter switch SW is turned on by the first half of the shutter button stroke, then the tooth train 67 moves from a position slightly left to the highest speed position of the scales toward the right. At a position slightly behind the balanced position, the plunger 69 starts to operate, the position of the shutter speed dial is determined, followed by the release of the shutter. When the aperture is opened wider than the specified aperture, the aperture is the same both in light-measuring time and exposure-making time as in the case of FIG. 4a. Moreover, a programmed EE camera can be obtained by linking the motion of the preset diaphragm member 52''' with the shutter speed dial T. The excess opening of the diaphragm, expected to happen at time of plunger operation, can be predetermined because it is a deviation to one direction. As has been mentioned so far, this invention is also easily applicable to an existing EE camera.

The position of the light-receiving portion of the exposure meter may be at any position as long as it is positioned behind the diaphragm. For example, the system in which the brightness of the focusing screen is measured brings the same effect. In this case, the change in the accepting light amount does not coincide with the change in the proper exposure amount ratio as shown by the alternate long and dash line 65 in FIG. 7 for an $f/1.4$ lens because the focusing screen is not conjugate with the film plane, and because the measurement is affected by the degree of diffusion of the focusing screen, and because the measurement differs with the range of light-accepting field, and so forth. The $a$ shown in the example of the existing camera is replaced with $as$. The difference between 65 and 66 remains as the error even in the case of the stopping-down light-measuring system and is unavoidable even in this example. This amount can be reduced by making the light-accepting part as conjugate as possible with the film plane.

It is also possible to enable the diaphragm to be fully opened at any time by other operating parts in a system arranged according to this invention which are not responsive to the operation of the preset aperture part. For example, in FIG. 3 or in FIGS. 4a, 4b, and 4c it is sufficient that the camera body 29 retreats sufficiently rightward to interlock with the operation of said operating part and that the automatic diaphragm drive part follows the movement of the camera. It is also possible to avoid an erroneous exposure by providing means to stop the function of the exposure meter by, for example, turning off the switch of the exposure meter circuit linking it with the operating part. As have been described so far, features according to this invention including the following:

1. With the preset diaphragm scales equally spaced, the exposure counting on the specific shortage of the amount of peripheral light at full-open aperture or near it is measured, and at small apertures the finder is kept bright.

Therefore, the aperture scale can be easily displayed on the camera side (for example, in the finder), the peripheral under exposure at an exposure near the full-open aperture can be avoided, and the limit of the measurable brightness does not fall with the aperture near the common aperture most often used. Moreover, the finder is easy to lock for the camera having the finder located behind the diaphragm and the aperture used for photographing does not tend to approach the larger apertures which have shallow depth of fields.

2. In a full-open light measuring camera provided with means of indicating the aperture in the finder, if the range of scales displayed in the finder is equally spaced to a sufficiently large aperture, the camera can be used unchanged even when a lens having a larger full-open aperture than that previously expected is attached to the camera (the value of the new lens corresponding to $a$ is unknown until the lens is made).

3. There are cases in which lenses with the same full-open F number have different peripheral under exposure. Therefore, when arranging the correction scales separately for each full-open F number, the correction scales are determined as the mean value or center value of those lenses. Therefore, according to this invention the error caused by the deviation from the means value or center value can be made smaller or zero.

4. Even in such a lens where, the effective F numbers are made constant when it is advanced or zoomed but the aperture diameter cannot be changed at its full-open state, the trouble, such as correcting the measured value manually corresponding to the aperture value and the amount of advancement, can be avoided. (That is indispensable, especially in EE cameras.)

What is claimed is:

1. A single-lens reflex camera comprising in combination an automatic preset diaphragm;

an operating member coupled to the blades of said diaphragm for varying the diaphragm aperture and movable between a full opening position and a minimum opening position;

a diaphragm-actuating member operable in accordance with shutter-releasing operation, said actuating member retaining said operating member in a predetermined position in which the diaphragm aperture size is less than its maximum aperture and freeing said operating member from said predetermined position to its minimum opening position in accordance with the shutter-releasing operation;

a diaphragm aperture selector operable by hand and including abutment means movable along the path of movement of said operating member, said abutment means being adapted to arrest said operating member in its preselected position when said operating member is released by said actuating member and to move said operating member from said predetermined position to said full opening position for adjusting the actual aperture of said diaphragm;

a light-sensitive element responsive to the light through the actual aperture of said diaphragm when said operating member is retained by said actuating member in its predetermined position and is positioned by said abutment means between its predetermined position and its full opening position;

means electrically actuated by said light-sensitive element in accordance with output of said element, and means for interconnecting said diaphragm aperture selector with said electrically actuated means while said operating member is retained by said actuating member.

2. A single lens reflex camera according to claim 1, wherein said diaphragm aperture selector has a stop value indicating scale in equal intervals and a protrusion normally engageable with said interconnecting means, whereby said protrusion is disengaged from said interconnecting means when said operating member is located by said actuating member in a range between its predetermined position and its full opening position.

3. A single lens reflex camera according to claim 1, wherein said electrically actuated means is a galvanometer and said interconnecting means includes a cam member moved with said diaphragm aperture selecting member and engageable with the needle of said galvanometer which is displacable responsive to the electrical putput of said light-sensitive element.

4. A single lens reflex camera according to claim 1, wherein said electrically actuated means has a circuit including a pair of transistors connected to said light-sensitive element, an electrical magnet and a variable resistor, for automatically controlling the exposure factor setting operation.

* * * * *